Figure 1:
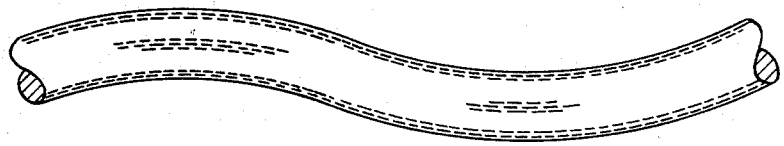

Aug. 9, 1960 A. L. JANKENS 2,948,048
ORIENTED THERMOPLASTIC FILAMENT HAVING A SATINY APPEARANCE
Filed Nov. 4, 1955

INVENTOR.
Austin L. Jankens
BY
Griswold & Burdick
ATTORNEYS

2,948,048
ORIENTED THERMOPLASTIC FILAMENT HAVING A SATINY APPEARANCE

Austin L. Jankens, Bay City, Mich., assignor to The Dow Chemical Company, Midland, Mich., a corporation of Michigan Filed Nov. 4, 1955, Ser. No. 544,966

1 Claim. (Cl. 28—82)

This invention relates to a composition of matter and to a process for preparing oriented thermoplastic filaments having a unique appearance. More particularly, it relates to a process for preparing oriented filaments which have a satiny finish from normally crystalline vinylidene chloride polymers, and to the filaments so produced.

Filaments prepared from normally crystalline vinylidene chloride polymers have found widespread use in making upholstery fabrics for automobile seat covers and weather-resistant furniture. Such filaments are easily prepared by extrusion methods and are readily colored with a wide variety of pigments. However, as normally produced, they have light-reflective smooth surfaces, and are available only in a form having a high gloss and translucency. For many applications it would be desirable to have filaments having a flat or matte finish which would give a satiny appearance and opaqueness to an article woven from such filaments. In the past it has been attempted unsuccessfully to prepare filaments having such an appearance by using light absorptive or dispersive pigments and other additives.

It is accordingly an object of this invention to provide a new composition of matter and a process for preparing opaque filaments having a satiny appearance from such compositions containing normally crystalline vinylidene chloride polymers.

It is a further object to prepare such filaments having substantially the same density, strength, and flexibility as previously prepared filaments.

The above and related objects are accomplished by forming an intimate powder mixture of a normally crystalline vinylidene chloride polymer and minor amounts of trisodium aconitate, expressing that mixture while molten through a filament forming die, and finally stretching the resulting filament to produce orientation. Filaments prepared in accordance with this invention hase a unique satiny appearance and are opaque but retain the desirable strength and flexibility of otherwise identical fibers prepared without the trisodium aconitate.

The normally crystalline vinylidene chloride copolymers that are useful in the process of this invention are those containing at least 70 percent by weight of vinylidene chloride together with 30 percent or less of a copolymerizable monoethylenic monomer such as vinyl chloride, vinyl acetate, or acrylonitrile. Such copolymers are normally impossible to fabricate thermally without the addition of plasticizers and the process of this invention operates successfully when normal amounts of the usual plasticizers are employed.

The trisodium aconitate may be dry blended into the polymer or may be added as an aqueous solution to the polymer and the wet mixture dried. Alternately, there may be used aconitic acid and a basic sodium salt which can neutralize the acid. A preferred method is to prepare an aqueous solution of aconitic acid and a sodium phosphate which is a heat stabilizer for the polymer. The sodium phosphates which have been found operable in the latter method are tetrasodium pyrophosphate and trisodium phosphate. The mono- and disodium phosphates are not effective heat stabilibers for the polymer and are not basic enough to neutralize aconitic acid and form trisodium aconitate which requires a pH of at least 9. Although other basic inorganic salts might be used to form the trisodium aconitate, such a method would add foreign materials of questionable value to the mixture.

Figure 3:
Figure 2:
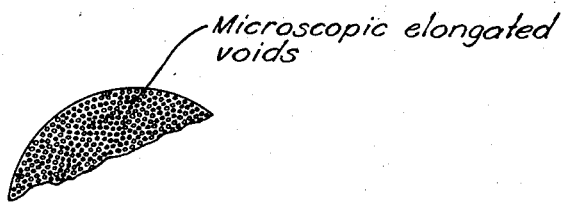

The amount of trisodium aconitate that should be employed in the process of this invention may be varied from 0.01 to 5 percent based on the weight of polymer employed. The preferred amount is from 0.5 to 1 percent. When the higher limit is exceeded the amount of foaming during extrusion becomes excessive, and the resulting articles are of very low density and correspondingly low tensile strength. In contrast, when the trisodium aconitate is used in the amounts indicated, very tiny bubbles or voids are produced which are elongated during the subsequent stretching of the extruded filaments resulting in the longitudinal axis of the voids being in parallel alignment with each other and with the longitudinal axis of the filament. Although there is no critical size for the voids they are not individually visible to the naked eye. The density of the filaments is not appreciably reduced and the strength of the filaments is not impaired. The form of the new filaments is illustrated in the annexed drawings wherein Fig. 1 represents a greatly enlarged side elevation of a filament, Fig. 2 represents an even more exaggerated enlargement of a fragmentary cross-section of a filament, and Fig. 3 shows the general shape of one of the voids in still greater magnification.

Other ingredients such as pigments may be added to the mixture for special effects without affecting the process. By a careful selection of such materials a trained formulator can achieve some very striking effects, such as a metallic luster, in the filaments.

The process of the invention will be more apparent from the following illustrative example wherein all parts and percentages are by weight.

Example

A mixture was prepared from a copolymer which had been made from a monomeric material consisting of 85 percent vinylidene chloride and 15 percent vinyl chloride and 4 percent of salol, a known light stabilizer for that polymer. To the above mixture was added 8 percent of tributyl aconitate, a known plasticizer for the polymer, 1 percent titanium dioxide as a pigment, 0.5 percent tetrasodium pyrophosphate, and 0.5 percent aconitic acid. The mixture was extruded as a 10 mil monofilament, which was supercooled in a water bath immediately after extrusion, then warmed slightly, and finally stretched to 4 times its extruded length. The resulting filaments had a satiny appearance, a density of 1.2, and a tensile strength of 30,000 pounds per square inch.

Filaments of similar appearance were prepared when 0.5 percent trisodium phosphate was substituted for tetrasodium pyrophosphate. Other mixtures in which trisodium aconitate was used as a powder in place of the aconitic acid-phosphate mixture, gave the same desirable results.

By way of contrast, when filaments were prepared from a mixture similar to the above but omitting the aconitic acid, the filaments were translucent and had a high gloss.

I claim:

A filamentary article composed of a normally crystalline vinylidene chloride polymer having elongated microscopic voids throughout the body of the article, the longitudinal axis of each void being parallel with the longitudinal axis of said article, said article characterized by having a satiny appearance.

(References on following page)

References Cited in the file of this patent

UNITED STATES PATENTS

| | | |
|---|---|---|
| Re. 20,953 | Stoeckly | Dec. 20, 1938 |
| 2,065,766 | Taylor | Dec. 29, 1936 |
| 2,251,486 | Hanson | Aug. 5, 1941 |
| 2,252,554 | Carothers | Aug. 12, 1941 |
| 2,399,259 | Taylor | Apr. 30, 1946 |
| 2,542,973 | Abernethy | Feb. 27, 1951 |
| 2,543,027 | Jones | Feb. 27, 1951 |
| 2,612,679 | Ladisch | Oct. 7, 1952 |
| 2,788,563 | Stuchlik et al. | Apr. 16, 1957 |
| 2,806,823 | Sullivan | Sept. 17, 1957 |
| 2,808,379 | Welter | Oct. 1, 1957 |

FOREIGN PATENTS

| | | |
|---|---|---|
| 302,492 | Switzerland | Jan. 3, 1955 |